2,874,146
POLYMERIC COMPOSITIONS

Raymond Deverell-Smith, John Mitchell, and Harry James Twitchett, Manchester, England, assignors to Imperial Chemical Industries Limited, London, England, a corporation of Great Britain No Drawing. Application June 26, 1956
Serial No. 593,830
Claims priority, application Great Britain June 29, 1955
8 Claims. (Cl. 260—45.85)

This invention relates to polymeric compositions having improved resistance to the effects of ultraviolet light.

The deleterious effect of light, in particular of ultraviolet light, or organic materials is well known. It is responsible for fading of many dyestuffs and pigments and is one of the causes of embrittlement, discolouration, loss of tensile strength and impairment of electrical properties of synthetic polymers and of natural products such as cellulose, wood and rubber. Ultraviolet radiation also causes erythema and deterioration of many substances including food, particularly fats, which develop rancidity.

The use of ultraviolet absorbing compounds to mitigate the effect of light is well known and many compounds have been proposed for application in a variety of media including synthetic polymers, natural and synthetic fibres, coating compositions and varnishes, wrapping materials, cosmetics, and photographic film, filters, etc.

The hitherto described compounds have been found to be not entirely satisfactory owing, for example, to insufficient ultraviolet light absorption, undesirable visible light absorption, insufficient stability of the compounds or incompatibility with the medium in or on which they are to be employed. Some of the compounds suggested for use are strongly fluorescent and for some purposes this property is undesirable.

We have now found that a certain class of monoazo compounds is outstandingly free from these defects.

Thus according to the present invention we provide polymeric composition having improved resistance to the effects of ultraviolet light characterised in that there is incorporated therein at least one monoazo compound of the formula $$A-N=N-\underset{\underset{Y}{|}}{\overset{\overset{X}{|}}{C}}-H$$

wherein A stands for a benzene nucleus carrying at least one negative substituent and X and Y stand for —CN, —COCH$_3$, —CONH$_2$ or —COO(Alkyl up to 4 carbon atoms) groups, the same or different.

As examples of negative substituents which may be present in the benzene nucleus, we mention —Cl, —Br, —CN, —CF$_3$, —SO$_3$H, —COOH, —COC$_6$H$_5$, —SO$_2$Alkyl, —COOAlkyl, —SO$_2$NRR', —CONRR', wherein R and R' stand for hydrogen or the groups alkyl, cycloalkyl, aryl, or aralkyl, and may be the same or different.

A lower alkyl group may also be present in the benzene nucleus, A, provided at least one negative substituent as described above is present at the same time.

The monoazo compounds used in the polymeric compositions of the invention may be prepared by conventional methods for preparing azo compounds, using as starting materials an aromatic amine of the formula A—NH$_2$, wherein A has the significance stated above and a coupling component of the general formula

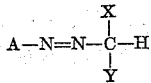

As examples of aromatic amines of the formula A—NH$_2$ there may be mentioned: anthranilic acid, methyl anthranilate, sulphanilic, orthanilic and metanilic acids, 4-chloro-2-aminobenzoic acid, m-aminobenzoic acid, mono- and dichloroanilines, 2-chloro-4-aminotoluene-5-sulphonic acid and isomers, 3-aminobenzenesulphondimethylamide, 3-amino-4-ethanesulphonylbenzotrifluoride.

As examples of coupling components of the general formula

there may be mentioned acetylacetone, acetoacetamide, malondinitrile, or alkyl esters of acetoacetic, malonic, or cyanacetic acids.

Such monoazo compounds of this invention as contain —COOH or —SO$_3$H groups may be used either in the form of the free acids or as metallic salts.

Such monoazo compounds as are derived from an amine A—NH$_2$ wherein the benzene nucleus, A, contains a —COOH substituent in ortho position to the amino group yield ortho carboxyazo compounds and these products can form coordination metal complexes with certain metals such as chromium or nickel. The use of such metal complexes is included within the scope of this invention.

As examples of polymeric materials that can be improved by the incorporation therein of the monoazo compounds described above there may be mentioned natural polymeric materials such as rubber, natural or regenerated cellulose, and synthetic polymeric materials such as cellulose esters and ethers, vinyl polymers, for example polystyrene, polythene, polyvinyl chloride, polymethylmethacrylate, phenol, urea or melamine aldehyde condensation products, polyamides, polyesters, solid or cellular polyurethanes, butadiene polymers and alkyd resins.

The monoazo compounds may be incorporated into the polymeric materials at any convenient stage in the manufacture thereof. Thus they may be added, for example, as powders or in the form of solutions or dispersions to the molten polymers, to the monomeric substances prior to polymerisation, to solutions or dispersions of the polymers or to the polymer in its final manufactured state by a dyeing procedure or by lacquering or coating the surface with a film-forming substance containing the compound.

Other ingredients which are conventionally employed may be added to the polymeric compositions during manufacture, for example pigments, fillers, solvents or plasticisers. Where these additives contribute to opacity of the polymer, higher concentrations of the ultraviolet absorbing compound may be necessary to ensure adequate protection in the surface layers.

The improved compositions may be fabricated into films, coatings, mouldings, extrusions, castings or laminates and may then be used as such, when the monoazo compounds are found to preserve the said fabricated materials from the adverse effects of ultraviolet light to an outstanding degree; or they may be used, for example, as films or surface coatings in order to protect other materials from the said adverse effects.

The amount of monoazo compound to be used depends upon the function intended. Thus it is found that from 0.01% to 5% of the compound on the weight of the polymeric material suffices to protect the material itself. When it is desired to protect materials enclosed within articles composed of the polymeric compositions, amounts of up to 10% may be used depending on the thickness of the treated polymeric material.

The invention is illustrated but not limited by the following examples in which parts are by weight.

Example 1

A cellulose acetate moulding powder is obtained by mixing 65 parts of cellulose acetate flake (acetyl value 55%)
35 parts of dimethylphthalate
0.01 part of Waxoline Red OS (C. I. No. 258)
0.1 part of ethyl 2:5-dichlorophenylazocyanacetate The mixture is masticated on a hot two roll mill at 130° C. The resulting material is then cooled and granulated to produce a red moulding powder. The transparent red plastic mouldings produced from this powder are faster to light than when the ultraviolet absorbing compound is omitted. Similar results are obtained when the ultraviolet absorbing compound used is diethyl 3-sulphonamidophenylazomalonate or dimethyl 2 - carboxyphenylazomalonate or the calcium salt of ethyl 2-carboxy-5-chlorophenylazocyanacetate or methyl 4-chlorophenylazoacetoacetate.

Waxoline Red OS (C. I. No. 258) mentioned above is the colouring matter listed as No. 258 in "Colour Index," first edition, 1924, published by The Society of Dyers and Colourists.

Example 2

A polystyrene moulding powder is obtained by mixing 100 parts of polystyrene
0.2 part of the rosinated calcium salt of 1-(2'-sulphophenylazo)-2-hydroxynaphthalene-3 - carboxylic acid
0.4 part of titanium dioxide (rutile)
0.5 part of diethyl 2-carboxyphenylazomalonate and masticating in a molten state on a hot two roll mill or in an extrusion machine. The material is then cooled and granulated to produce a pink polystyrene moulding. Mouldings are produced in a conventional manner. Such mouldings are faster to light than when the ultraviolet absorber is omitted. Similar results are obtained when the ultraviolet absorbing compound used is diethyl 3 - carboxyphenylazomalonate, or diethyl 4-sulphonamidophenylazomalonate, or dimethyl 4-diethylsulphonamidophenylazomalonate or the barium salt of ethyl 2-carboxyphenylazocyanacetate.

Example 3

A polyethylene moulding or extrusion compound is obtained by mixing 100 parts polyethylene
0.2 part of the rosinated calcium salt of 1-(2'-sulphophenylazo)-2-hydroxynaphthalene-3-carboxylic acid
0.4 part of titanium oxide (rutile), and
0.5 part of the reaction product of chromium acetate and diethyl 2-carboxyphenylazomalonate The mixture is masticated in a molten state on a hot two roll mill and is cooled and granulated to produce a pink moulding or extrusion compound.

Mouldings or extrusions made from this compound are more durable when exposed to light than if the ultraviolet absorbing azo compound is omitted.

Similar results are obtained when the ultraviolet absorbing compound is methyl 4-sulphonamidophenylazocyanacetate or methyl 2-carboxyphenylazocyanacetate or diethyl 3-sulphonamidophenylazocyanacetate or n-butyl 4-chlorophenylazocyanacetate or the reaction product of chromium acetate and diethyl 2-carboxy-4-chlorophenylazomalonate.

Example 4

A polythene moulding compound is obtained by mixing 100 parts of polythene
0.1 part of the rosinated calcium salt of 1-(2'-sulphophenylazo)-2-hydroxynaphthalene-3-carboxylic acid
1.0 part of ethyl 2-carboxyphenyl azocyanacetate.

The mixture is masticated in a molten state on a hot two roll mill and is cooled and granulated to produce a red moulding compound.

Mouldings made from this compound fade less readily than similar mouldings made from compounds omitting the ultraviolet absorbing agent; they also show a marked improvement in retention of physical properties. A method is described in British patent specification 684,976 for assessing improved durability of polythene by measurement of power factor. By using this method with the mouldings of the present example the following results are obtained:

|  | Power factor | |
|---|---|---|
|  | Before exposure | After exposure to daylight |
| Mouldings prepared as described above | 0.0003 | 0.0014 |
| Similarly prepared moulding with ultra violet absorber omitted | 0.0005 | 0.0034 |

What we claim is:

1. A composition comprising a polymer which is normally effected deleteriously by ultraviolet light selected from the group consisting of cellulose esters and solid polymers of olefinic monomers having incorporated therein a pigment and from 0.01% to 10%, on the weight of said material, of a monoazo compound of the formula:

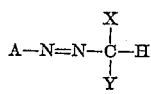

wherein A stands for a benzene nucleus carrying at least one negative substituent selected from the group consisting of —Cl, —Br, —CN, —CF₃, —SO₃H, —COOH, —COC₆H₅, —SO₂ (lower alkyl), —COO (lower alkyl), —SO₂NRR', —CONRR' wherein R and R' are selected from the group consisting of hydrogen, lower alkyl, cyclolower alkyl, monocyclic aryl and monocyclic aryl-lower alkyl and X and Y are selected from the group consisting of —CN, —COOCH₃, —CONH₂ and —COO (alkyl up to four carbon atoms).

2. A composition as defined in claim 1 wherein said monoazo compound is ethyl-2-carboxy-5-chlorophenylazocyanoacetate.

3. A composition as defined in claim 1 wherein said monoazo compound is ethyl-2-carboxyphenylazocyanoacetate.

4. A composition as defined in claim 1 wherein said monoazo compound is methyl 4-sulphonamidophenylazocyanacetate.

5. A composition as defined in claim 1 wherein said monoazo compound is ethyl 3-sulphonamidophenylazocyanacetate.

6. A composition as defined in claim 1 wherein said polymer is cellulose acetate.

7. A composition as defined in claim 1 wherein said polymer is polystyrene.

8. A composition as defined in claim 1 wherein said polymer is polyethylene.

References Cited in the file of this patent

UNITED STATES PATENTS

| 2,382,904 | Pederson | Aug. 14, 1945 |
| 2,453,661 | Glass et al. | Nov. 9, 1949 |
| 2,508,295 | Reckmeyer | May 16, 1950 |

FOREIGN PATENTS

| 450,021 | Great Britain | July 8, 1936 |